(12) United States Patent
Martinez

(10) Patent No.: US 7,248,636 B2
(45) Date of Patent: Jul. 24, 2007

(54) SYSTEMS AND METHODS FOR ADJUSTING AN OUTPUT DRIVER

(75) Inventor: Boris N. Martinez, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 10/828,433

(22) Filed: Apr. 20, 2004

(65) Prior Publication Data

US 2005/0233701 A1    Oct. 20, 2005

(51) Int. Cl.
*H04L 25/00* (2006.01)

(52) U.S. Cl. .................. 375/257; 375/219; 326/30

(58) Field of Classification Search ........ 375/257–259, 375/219, 220, 288; 326/16, 30; 370/248, 370/249, 286
See application file for complete search history.

(56) References Cited

U.S. PATENT DOCUMENTS

| | | | |
|---|---|---|---|
| 5,086,271 A | 2/1992 | Haill et al. | |
| 5,095,231 A | 3/1992 | Sartori et al. | |
| 5,134,311 A | 7/1992 | Biber et al. | |
| 5,241,221 A | 8/1993 | Fletcher et al. | |
| 5,296,756 A | 3/1994 | Patel et al. | |
| 5,422,608 A | 6/1995 | Levesque | |
| 5,581,197 A | 12/1996 | Motley et al. | |
| 5,606,275 A | 2/1997 | Farhang et al. | |
| 5,621,335 A | 4/1997 | Andresen | |
| 5,760,601 A | 6/1998 | Frankeny | |
| 5,789,937 A | 8/1998 | Cao et al. | |
| 5,808,478 A | 9/1998 | Andresen | |
| 5,877,647 A | 3/1999 | Vajapey et al. | |
| 5,955,894 A | 9/1999 | Vishwanthaiah et al. | |
| 6,018,450 A | 1/2000 | Ahmad et al. | |
| 6,060,907 A | 5/2000 | Vishwanthaiah et al. | |
| 6,085,033 A | 7/2000 | Starr et al. | |
| 6,087,847 A | 7/2000 | Mooney et al. | |
| 6,087,853 A | 7/2000 | Huber et al. | |
| 6,118,310 A | 9/2000 | Esch, Jr. | |
| 6,133,725 A | 10/2000 | Bowhers | |
| 6,140,885 A | 10/2000 | Abadeer et al. | |
| 6,166,971 A | 12/2000 | Tamura et al. | |
| 6,175,239 B1 | 1/2001 | Hall | |
| 6,175,250 B1 | 1/2001 | Hedberg | |
| 6,198,307 B1 | 3/2001 | Garlepp et al. | |
| 6,201,405 B1 | 3/2001 | Hedberg | |
| 6,278,339 B2 | 8/2001 | Abadeer et al. | |
| 6,297,677 B1 | 10/2001 | Ang et al. | |
| 6,316,957 B1 | 11/2001 | Ang et al. | |

(Continued)

OTHER PUBLICATIONS

Groen et al. (US 2006/0006901)—DAC Based Driver With Selectable Pre-Emphasis Signal Levels.*

*Primary Examiner*—Dac V. Ha

(57) ABSTRACT

Systems and methods for dynamically adjusting an output driver are invented and disclosed. One embodiment comprises receiving a first signal. Applying the first signal to a first tuning element to generate a reference signal. Receiving a second signal. Applying the second signal to a second tuning element to generate a test signal, wherein the second tuning element is configured similarly to the first tuning element. Sampling the reference signal to generate a time-sampled reference signal. Sampling the test signal to generate a time-sampled test signal. Integrating the time-sampled reference signal and the time-sampled test signal to generate an error signal. Then, applying the error signal to adjust an output driver.

20 Claims, 9 Drawing Sheets

U.S. PATENT DOCUMENTS

| | | |
|---|---|---|
| 6,369,605 B1 | 4/2002 | Bonella et al. |
| 6,384,621 B1 | 5/2002 | Gibbs et al. |
| 6,384,622 B2 | 5/2002 | Verhaeghe et al. |
| 6,400,616 B1 | 6/2002 | Tamura et al. |
| 6,420,913 B1 | 7/2002 | Ang et al. |
| 6,424,175 B1 | 7/2002 | Vangal et al. |
| 6,429,679 B1 | 8/2002 | Kim et al. |
| 6,448,813 B2 | 9/2002 | Garlepp et al. |
| 6,509,755 B2 | 1/2003 | Hernandez-Marti |
| 6,509,811 B2 | 1/2003 | Klein et al. |
| 6,522,083 B1 | 2/2003 | Roach |
| 6,525,569 B1 | 2/2003 | Leon |
| 6,573,746 B2 | 6/2003 | Kim et al. |
| 6,593,770 B2 | 7/2003 | Hernandez-Marti |
| 6,608,506 B2 | 8/2003 | Ang et al. |
| 6,661,250 B2 | 12/2003 | Kim et al. |
| 6,759,868 B2 * | 7/2004 | Helt et al. .................... 326/30 |

* cited by examiner

SYSTEMS AND METHODS FOR ADJUSTING AN OUTPUT DRIVER

BACKGROUND

In integrated circuits, such as microprocessors, memories, and the like, signals may be routed for relatively long distances using transmission lines. A transmission line may be a bus, a printed circuit board trace, or other types of electrical conductors for transporting a signal. Typically, a printed circuit board trace has a characteristic impedance of between 50 and 75 ohms. In complementary metal-oxide semiconductor (CMOS) circuits, the input impedance of a gate of a CMOS transistor is usually very high. The receiving end, or far end, of the transmission line is typically connected to an input of a logic circuit, where the input impedance is higher than the characteristic impedance of the transmission line. If the impedance coupled to the far end of the transmission line is different than the impedance of the transmission line, the signal will be reflected back to the sending end. Depending on the sending end impedance, the signal may overshoot/undershoot a planned steady-state voltage for the logic state. The signal may be reflected back and forth many times between the near end and the far end, causing oscillatory behavior of the signal at both ends. This repeated overshooting and undershooting of the signal is commonly known as "ringing," and results in reduced noise immunity and increased time for the signal to become, and remain, stable at the far end. Impedance matching is the practice of matching the impedance of the driver and/or the load to the characteristic impedance of the transmission line to reduce ringing and facilitate the most efficient transfer of signals.

Accordingly, output drivers are important building blocks in the input/output path of integrated circuits like microprocessors and memory systems. Output drivers are the primary interface through which data transmission takes place between the integrated circuit and external systems via transmission lines. The output driver converts chip-internal logic levels and noise margins to those required for driving the inputs of chip-external circuits in digital systems.

As bus speeds increase above 100 MHz, impedance mismatches become a significant concern as timing margins are reduced as a result of the increased clock frequency. A number of different approaches have been used to account for impedance mismatches in electronic data systems. Some of these approaches include adding passive external elements (resistors, inductors, etc.); adjusting the drive strength of output drivers; and actively terminating signal transmission lines.

Adding passive external elements requires printed circuit assembly area, increases power consumption and does not account for impedance variations due to variations in supply voltage, temperature, and age.

Solutions that adjust the drive strength typically provide a limited number of discrete settings or levels of drive strength. These discrete settings do not always allow the output driver to match the characteristic impedance of the transmission line that will be used to communicate signals. In addition, many solutions of this type use an external discrete resistor as a reference. The resistance of the discrete resistor does not always match the characteristic impedance of the transmission line at the operating frequency. While technicians can add additional discrete resistors in various combinations or networks to adjust the reference resistance, these solutions also do not account for impedance variations due to variations in supply voltage, temperature, and age.

Other on-chip solutions require the use of separate test input/output (I/O) pads for determining suitable impedance matching. In one example, an external test pad is used to determine a suitable pull-up circuit impedance whereas a separate additional test pad is used to determine suitable impedance matching for a pull-down circuit of the output buffer. The use of additional test pads and additional external resistors can impact board density, reliability, and cost.

Solutions that actively terminate transmission lines share many of the drawbacks of solutions that use external passive elements and solutions that adjust output drive strength. That is, active termination requires additional off chip elements, increases power consumption, and is susceptible to process, voltage, and temperature variations.

Therefore, it is desirable to introduce low-cost systems and methods for dynamic impedance matching.

SUMMARY

One embodiment of a system, comprises a reference driver coupled to a first tuning element, the reference driver and the first tuning element configured to receive a first input signal and generate a reference signal comprising a primary reference component and a reflected reference component, a test driver coupled to a second tuning element, the test driver and the second tuning element configured to receive a second input signal and generate a test signal comprising a primary test component and a reflected test component, and an integrator configured to receive the reference signal and the test signal and generate an error signal.

BRIEF DESCRIPTION OF THE DRAWINGS

The present systems and methods for adjusting an output driver, as defined in the claims, can be better understood with reference to the following drawings. The components within the drawings are not necessarily to scale relative to each other, emphasis instead is placed upon clearly illustrating the principles of the systems and methods.

DETAILED DESCRIPTION

Present systems and methods for adjusting an output driver measure the characteristic impedance of an example transmission line and apply a correction signal responsive to the characteristic impedance at a desired frequency to one or more output drivers. By measuring and responding to actual dynamic circuit conditions, the systems and methods for adjusting an output driver provide improved impedance matching in signal-processing systems across a range of conditions that can result from process, voltage, and temperature variation. Output driver calibration can be implemented at system start up and/or at other times as may be desired. Improved impedance matching guarantees signal timing margins and data integrity.

The characteristic impedance of transmission lines is measured using an electrically open tuning element coupled to the output of a reference driver by inserting an input signal having a desired frequency at the input to the reference driver. The reference driver generates a primary component of a reference signal. The tuning element generates a reflected component of the reference signal. In one embodiment, the tuning element is a printed-circuit board trace. The tuning element has a length such that input signal reflections due to input signal transitions at the desired frequency return to the output of the reference driver in synchronization with the input signal.

The reference signal is applied to an integrator in a feedback loop along with a test signal to calibrate an output driver. The integrator generates an error signal that can be applied to an output driver to automatically match output driver impedance to the characteristic impedance of transmission lines in a data processing system. The test signal, like the reference signal, is applied to a tuning element. In one embodiment, the tuning element is an electrically open transmission line. The test-tuning element has a length that closely approximates the length of the reference-tuning element. In one embodiment, the test signal is a square wave with a low duty cycle. When the output impedance of the output driver is not matched to the characteristic impedance of the open transmission line, the low on time (with respect to the off time) of the low duty cycle test signal permits the observation of signal reflections caused by the mismatch. When the controlled output driver is matched to the characteristic impedance of the transmission line, a single pulse having the same magnitude as the test signal is reflected back to the output driver.

Figure 1:
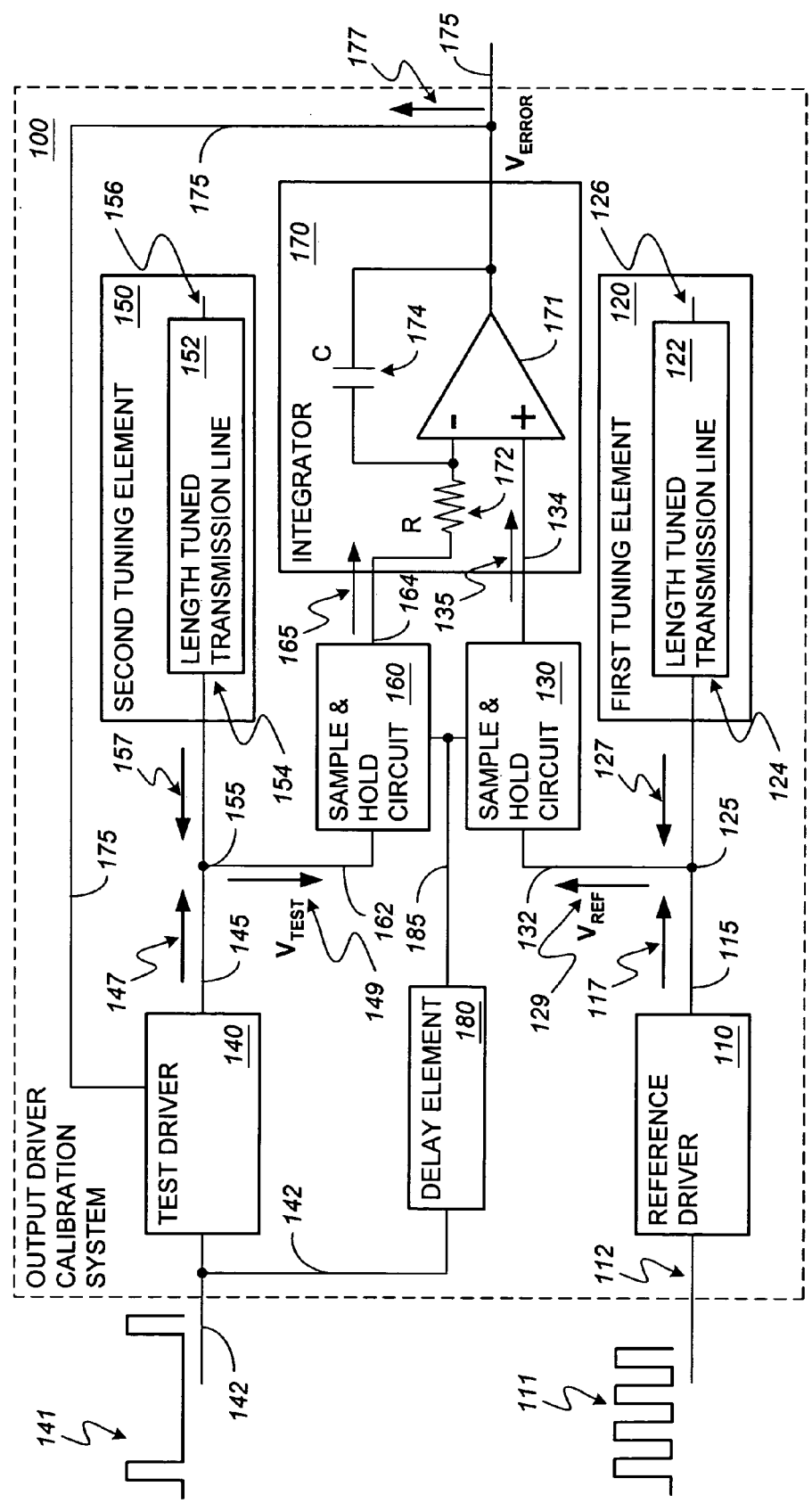
FIG. 1 is a combination circuit schematic and functional block diagram illustrating an embodiment of an output driver calibration system.

Turning to the drawings that illustrate various embodiments of systems and methods for adjusting an output driver, FIG. 1 is a combination circuit schematic and functional block diagram illustrating an embodiment of an output driver calibration system 100. Embodiments of the present systems for adjusting an output driver may be implemented in any system configured to transfer data. As such, the present systems for adjusting an output driver may be implemented in devices or systems across many different levels such as, but not limited to microprocessors, memory devices, application specific integrated circuits (ASICs) and a host of devices that use these types of components to transfer data, such as computers, test equipment, audio-video electronics, hand-held devices, etc.

Once an appropriate error signal has been identified, the error signal can be applied to an adjustable output driver. The determination of an appropriate error signal need not be fast relative to the operational frequency of the output driver. As long as transmission line impedance in the host system does not change appreciably over time, temperature, voltage, etc., then the error signal need not be adjusted at the operational frequency of the output driver. If the transmission line impedance in the host system does change, a new error signal could be determined and applied to the adjustable output driver. Although the output driver may be operating in the GHz range, transmission line impedance feedback provided by the output driver calibration system 100 could operate at lower frequencies.

As illustrated in FIG. 1, the output driver calibration system 100 receives two input signals, input signal 111 and input signal 141, and produces a single error signal 177, labeled $V_{ERROR}$. $V_{ERROR}$ is returned to the calibration system 100 to provide closed-loop feedback control. Input signal 111, illustrated as a square wave with a 50% duty cycle, is applied along conductor 112 to reference driver 110. Input signal 141, illustrated as a square wave with a much lower duty cycle than that of input signal 111, is applied along conductor 142 to test driver 140.

Reference driver 110 amplifies or otherwise buffers input signal 111 and generates a primary reference component 117 which is applied via conductor 115 to first tuning element 120. First tuning element 120 includes a length-tuned transmission line 122 having a first end 124 electrically coupled to conductor 115 and an electrically open end 126. The electrically open end 126 causes signal transitions in the primary reference component 117 to be reflected back towards the reference driver 110 along conductor 115. Length-tuned transmission line 122 has a length such that signal reflections due to rising edge transitions in the primary reference component 117 reflected by the open length-tuned transmission line 122 reach node 125 at substantially the same time as the next subsequent rising edge transition from primary reference component 117. For example, if input signal 111 is a clock signal with a period of 20 nanoseconds (nS), then the length of length-tuned transmission line 122 is such that signal reflections reach node 125 in 10 nS.

The length of length-tuned transmission line 122 is a function of various physical properties of the underlying transmission line and the desired clock frequency for managing data transmissions. For example, when the transmission line is a signal trace on a printed circuit board, the length is a function of at least the material, width, and thickness of the signal trace in addition to the desired clock frequency. When the transmission line is a signal trace in an ASIC, the length is a function of at least the material, width, and thickness of the signal trace as well as process variation that affects these physical characteristics across a desired signal layer of the ASIC.

Signal reflections generated by the electrically open length-tuned transmission line 122 produce a reflected reference component 127. Reference signal 129, labeled $V_{REF}$, is generated by the combination of the primary reference component 117 and the reflected reference component 127. Reference signal 129 is forwarded to sample and hold circuit 130 via conductor 132.

Test driver 140 amplifies or otherwise buffers input signal 141 and generates a primary test component 147 which is applied via conductor 145 to second tuning element 150. Second tuning element 150 includes a length-tuned transmission line 152 having a first end 154 electrically coupled to conductor 145 and an electrically open end 156. The electrically open end 156 causes signal transitions in the primary test component 147 to be reflected back towards the reference driver 140 along conductor 145. Length-tuned transmission line 152 has a length substantially the same as the length of length-tuned transmission line 122. Signal reflections generated by the electrically open length-tuned transmission line 152 produce a reflected test component 157. Test signal 149, labeled $V_{TEST}$, is generated by the combination of the primary test component 147 and the reflected test component 157. Test signal 149 is forwarded to sample and hold circuit 160 via conductor 162.

Delay element 180 receives input signal 141 via conductor 142. Delay element 180 generates a control signal responsive to input signal 141 along conductor 185, which is applied as a control input to sample and hold circuits 130, 160. In accordance with the control signal, sample and hold circuit 130 samples the reference signal 129 and provides time-sampled reference signal 135 via conductor 134 to integrator 170. Similarly, in accordance with the control signal, sample and hold circuit 160 samples the test signal 149 and provides time-sampled test signal 165 via conductor 164 to integrator 170.

As illustrated in FIG. 1, integrator 170 includes operational amplifier 171. Operational amplifier 171 has a positive input terminal and a negative input terminal and a single output terminal. The positive input terminal is coupled to sample and hold circuit 130 via conductor 134. The negative input terminal is coupled to sample and hold circuit 160 via conductor 164 and series resistor 172. The output terminal and the negative input terminal are coupled via capacitor 174. In operation, integrator 170 receives the time-sampled reference signal 135 and the time-sampled test signal 165 and generates error signal 177. As further illustrated in FIG. 1, error signal 177 is returned via conductor 175 to test driver 140 to adjust the drive strength of test driver 140.

Components of the systems for adjusting an output driver such as the reference driver 110, the test driver 140, the sample and hold circuits 130, 160, the integrator 170, and delay element 180 can be implemented with any or a combination of the following technologies, which are all well known in the art: a discrete logic circuit(s) having logic gates for implementing logic functions upon data signals, an ASIC having appropriate combinational logic gates (as described in the illustrated embodiment), a programmable gate array(s) (PGA), a field programmable gate array (FPGA), etc.

Figure 2:
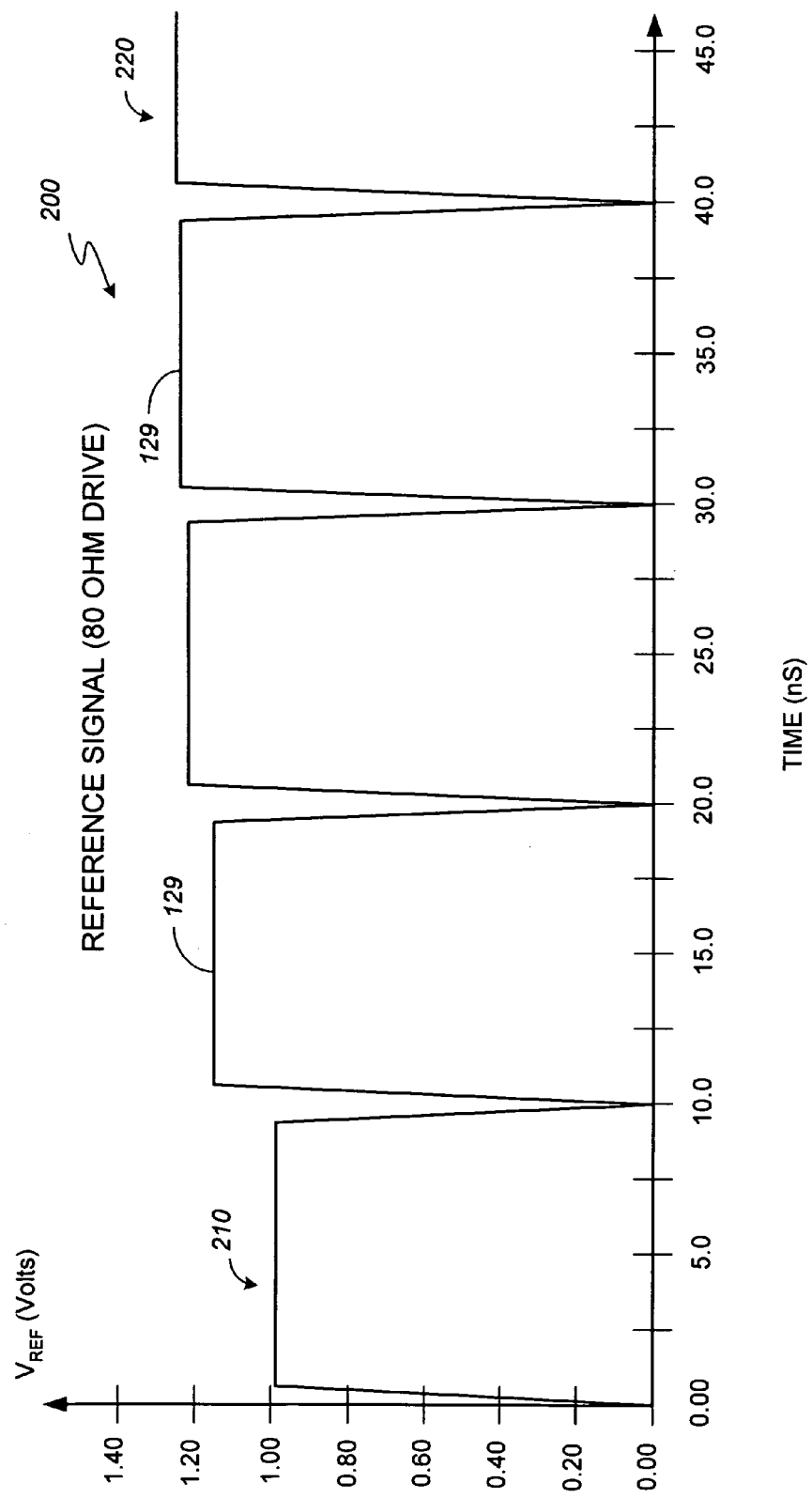
FIG. 2 is a graph illustrating an embodiment of a reference signal over time as applied to the output driver calibration system of FIG. 1.

The graphs presented in FIGS. 2 through 6 represent embodiments of the various voltages that can be expected over time in the output driver calibration system 100 of FIG. 1. The graphs reflect the various voltages from output driver calibration system turn-on from an off or inactive state. FIG. 2 is a graph 200 illustrating an embodiment of reference signal 129 over time as generated within the output driver calibration system 100 of FIG. 1. The horizontal axis illustrates elapsed time in nanoseconds (nS). The vertical axis illustrates reference signal amplitude in volts.

Due to impedance mismatches between the reference driver 110 and the length-tuned transmission line 122, first response signal peak 210 reaches approximately 0.96 volts. Subsequent response signal voltage peaks increase in magnitude until a steady-state peak voltage 220 is reached. The steady-state peak voltage is set by the output of the reference driver 110, which for the example illustrated in FIG. 2 is 1.25 volts. As illustrated, reference signal 129 reaches a steady-state peak voltage after approximately 40 nS. The particular signal trace illustrated in FIG. 2 is representative of an output-driver output impedance of 80 ohms and a transmission line characteristic impedance of 50 Ohms.

Figure 3:
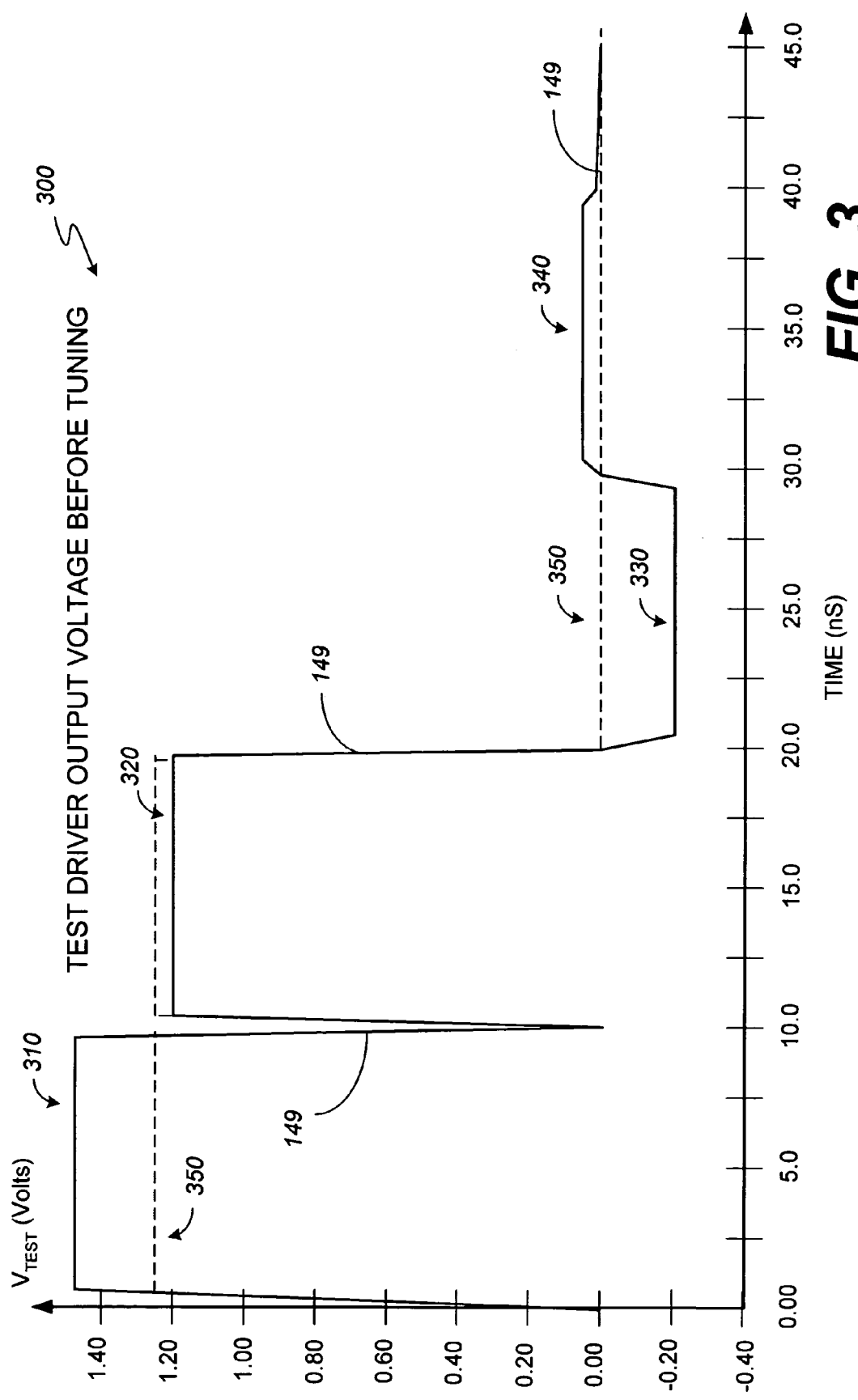
FIG. 3 is a graph illustrating an embodiment of a test signal over time as applied to the output driver calibration system of FIG. 1.

FIG. 3 is a diagram illustrating an embodiment of a test signal over time as generated within the output driver calibration system 100 of FIG. 1. Specifically, FIG. 3 is a graph 300 illustrating an example test driver output signal 149 before application of an error signal (i.e., before tuning). The horizontal axis illustrates elapsed time in nanoseconds. The vertical axis illustrates test signal amplitude in volts.

The test driver output voltage in the embodiment illustrated in FIG. 3 is the result of a single positive pulse from input signal 141. Input signal 141 is selected such that its magnitude closely resembles the magnitude of input signal 111. However, input signal 141 has a significantly longer "off" time (i.e., a period during which the input signal is not above the logic threshold) when compared to the off time of input signal 111. Input signal 111 has an approximately 50% duty cycle and completes a cycle every 20 nS. Input signal 141 has an approximately 10% duty cycle and completes a cycle every 100 nS. Input signal 141 is configured such that reflections due to signal transitions dampen before the next signal transition. Impedance mismatches between the output stage of the test driver and the characteristic impedance of length-tuned transmission line 152 are valid during the first positive pulse of input signal 141. After the first positive pulse (i.e., when input signal 141 is off) reflections distort the test voltage waveform.

As illustrated in graph 300, the test driver output voltage 149 due to a single positive peak in input signal 141 generates a first positive pulse 310 that overshoots the magnitude of the buffered test signal (i.e., the primary test component). A first reflected test signal pulse 320 is generated due to the electrical open at the end of the length-tuned transmission line 152. Subsequent reflected signal pulses 330 and 340 are also observed in the first 30 nS after the completion of first positive pulse 310. Each subsequent reflected signal pulse is characterized by a voltage peak that is lower in magnitude than an immediately preceding signal pulse, until reflected signal pulses are no longer detectable. Because of the relatively low duty cycle of input signal 141, reflected signal pulses damp out (i.e., are no longer detectable) prior to the next subsequent signal pulse from input signal 141.

In operation, if the sample and hold circuits 130, 160 of FIG. 1 can be adjusted via delay element 180 to sample the reference signal 129 and test signal 149 at an appropriate frequency (e.g., every 5 nS), then the integrator 170 can be used to generate an error signal 177 that can be used to correct or otherwise adjust the output drive strength of test driver 140 and other similarly configured output drivers designated to drive similarly configured transmission lines.

Signal trace 350 represented by the dashed line in graph 300 of FIG. 3 is representative of a desired output driver output voltage (i.e., test driver output impedance matched with characteristic impedance of length-tuned transmission line 152.)

Figure 4:
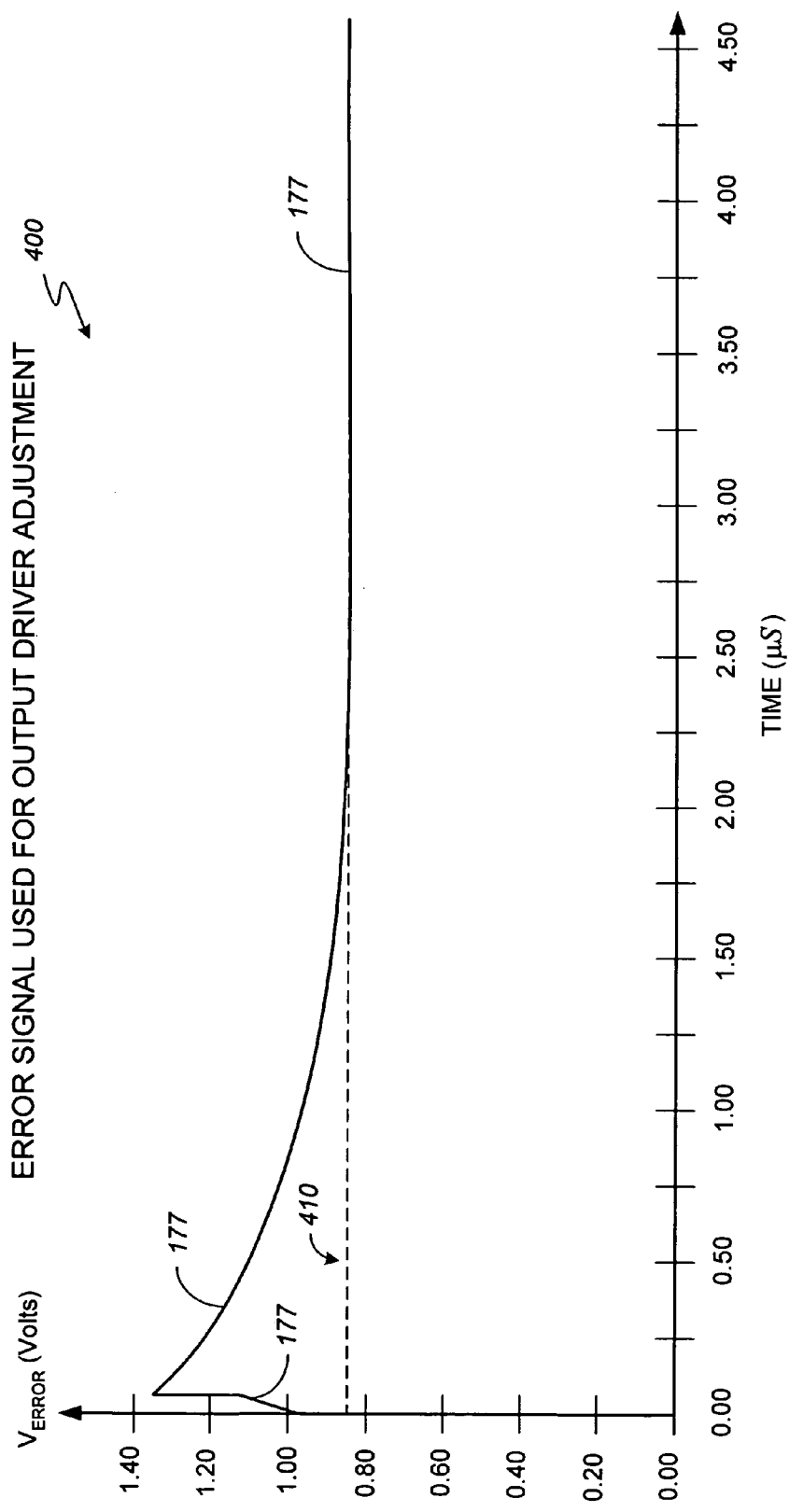
FIG. 4 is a graph illustrating an embodiment of an error signal over time as generated by the output driver calibration system of FIG. 1.

FIG. 4 is a diagram illustrating an embodiment of an error signal 177 over time as generated by the output driver calibration system 100 of FIG. 1. Specifically, FIG. 4 is a graph 400 illustrating an example error signal 177 used to adjust the test driver 140 in the output driver calibration system 100 of FIG. 1. The horizontal axis illustrates elapsed time since the output driver calibration system 100 was activated in microseconds (µS). The vertical axis illustrates error signal amplitude in volts. Near time 0, the output driver calibration system 100 produces an error signal 177 that is corrupted (i.e., incorrect) because of the initial activation of the system. By approximately 2.0 µS, error signal 177 has reached a steady-state correction value 410. The steady-state correction value 410 is the desired control signal to be returned to the output driver calibration system 100 and perhaps other similarly situated output drivers to adjust drive strength to match the characteristic impedance of transmission lines in the system. Error signal 177 converges toward steady-state correction value 410 in accordance with a time constant which is a function of the resistance of resistor 172 and the capacitance of capacitor 174 within integrator 170 (FIG. 1).

Figure 5:
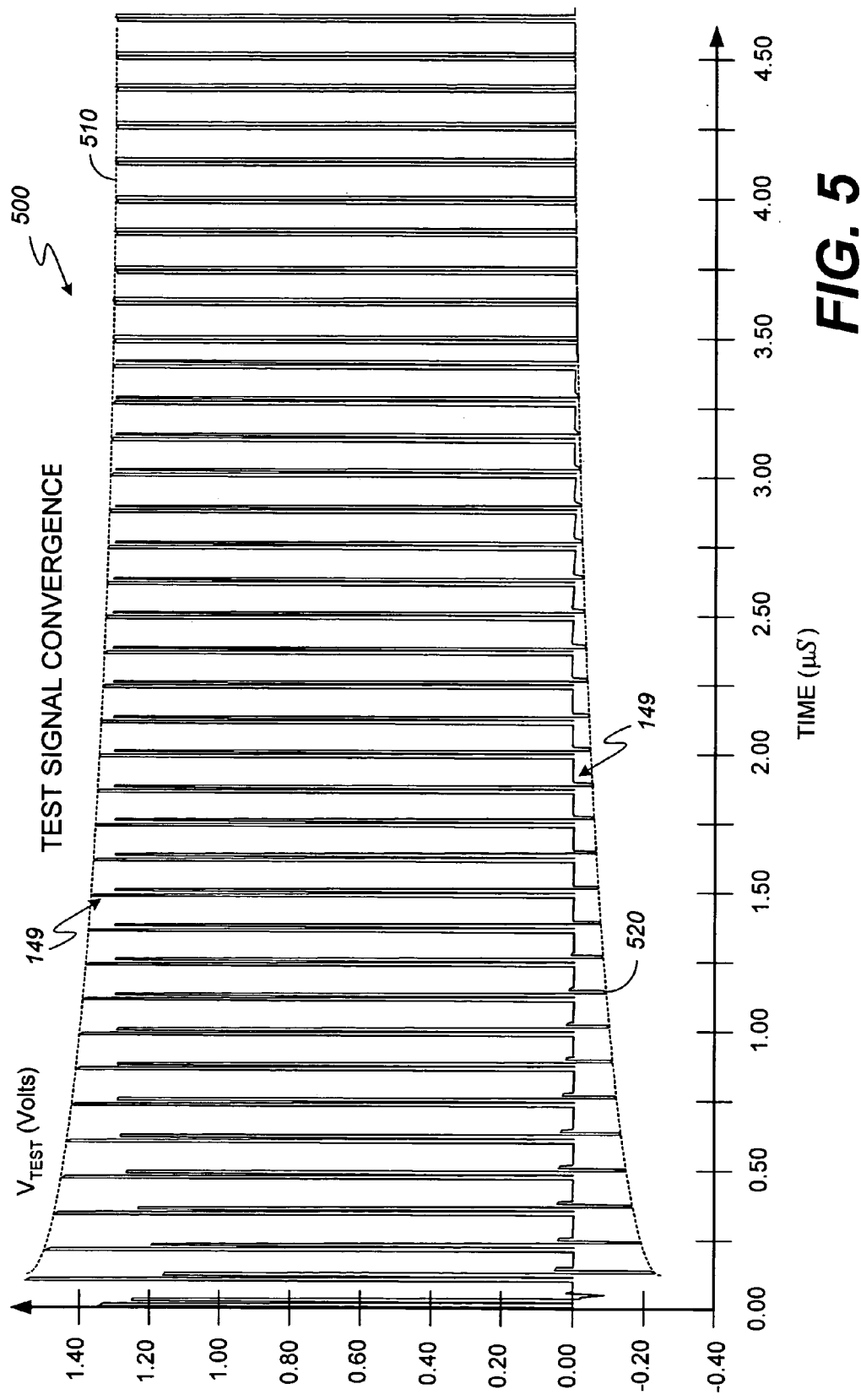
FIG. 5 is a graph illustrating an embodiment of a corrected test signal over time as generated by the output driver calibration system of FIG. 1.

FIG. 5 is a diagram illustrating an embodiment of a corrected test signal over time as generated by the output driver calibration system 100 of FIG. 1. Specifically, FIG. 5 is a graph 500 illustrating an example test signal 149 after adjustment of the test driver 140 using the error signal 177 generated by the output driver calibration system 100 of FIG. 1. The horizontal axis illustrates elapsed time since the output driver calibration system 100 was activated in microseconds. The vertical axis illustrates test signal amplitude in volts.

FIG. 5 illustrates multiple cycles of test signal 149 with correction via error signal 177 taking place. As indicated in graph 500, positive peak voltages associated with positive transitions of input signal 141 are reduced over time as indicated by positive envelope 510. Negative reflections associated with reflections due to impedance mismatches are also removed over time as indicated by negative envelope 520. After approximately 3 μS, the test driver 140 output strength has been suitably corrected and voltage overshoots and undershoots due to impedance mismatches have been substantially removed.

Figure 6:
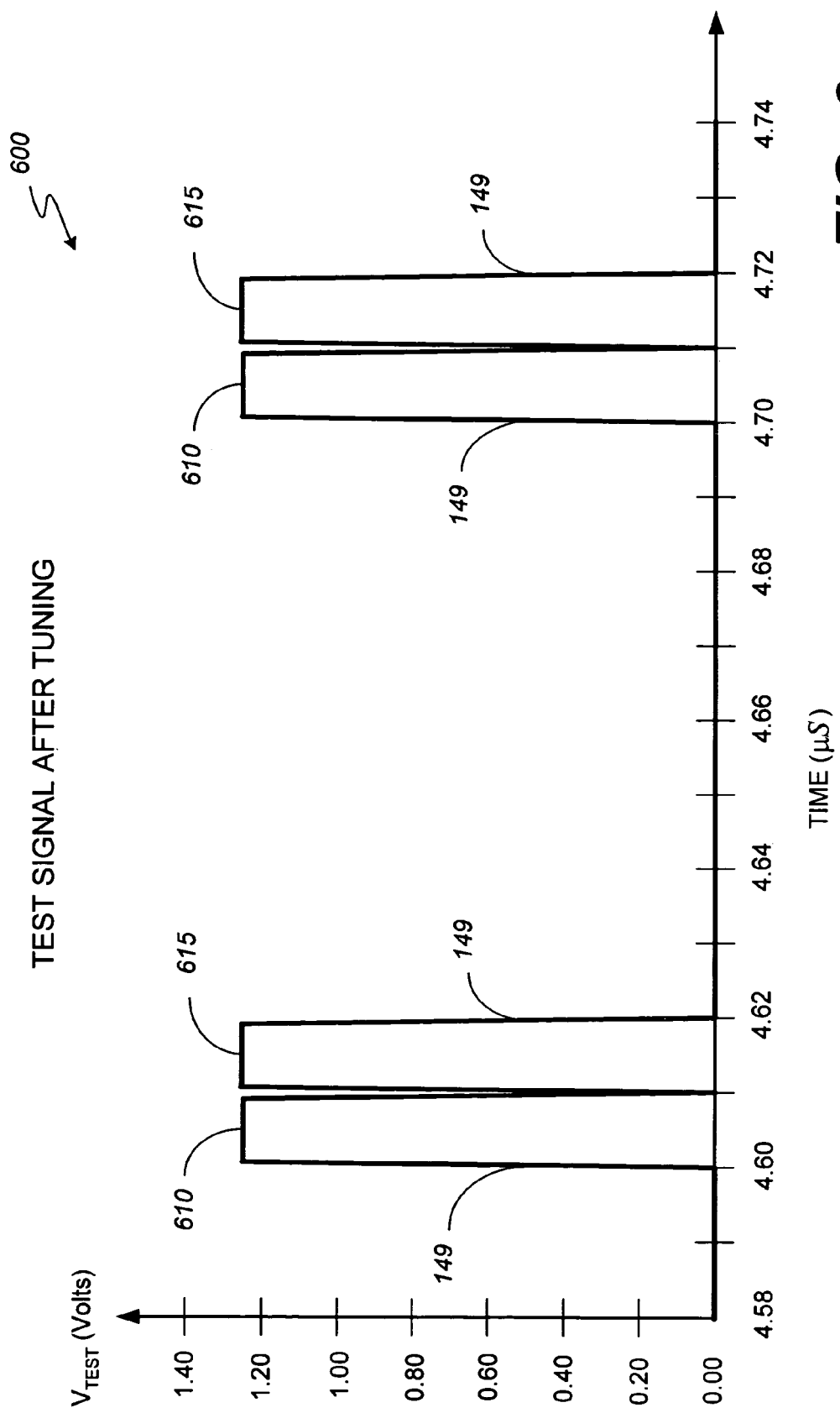
FIG. 6 is a graph illustrating the corrected test signal of FIG. 5 over a narrow time period.

FIG. 6 is a diagram illustrating the corrected test signal 149 of FIG. 5 over a narrow time period. Specifically, FIG. 6 is a graph 600 illustrating an example test signal 149 after adjustment of the test driver 140 using the error signal 177 generated by the output driver calibration system 100 of FIG. 1. The horizontal axis illustrates elapsed time since the output driver calibration system 100 was activated in microseconds (μS). The vertical axis illustrates test signal amplitude in volts.

As illustrated in FIG. 6, test signal pulses 610 responsive to second input signal transitions (and application of the error signal 177) have a magnitude of 1.25 volts. After calibration (i.e., application of the error signal 177) first reflected pulses 615 corresponding to respective test signal pulses have the same amplitude and there are no further reflections due to the test signal pulses 610.

Figure 7:
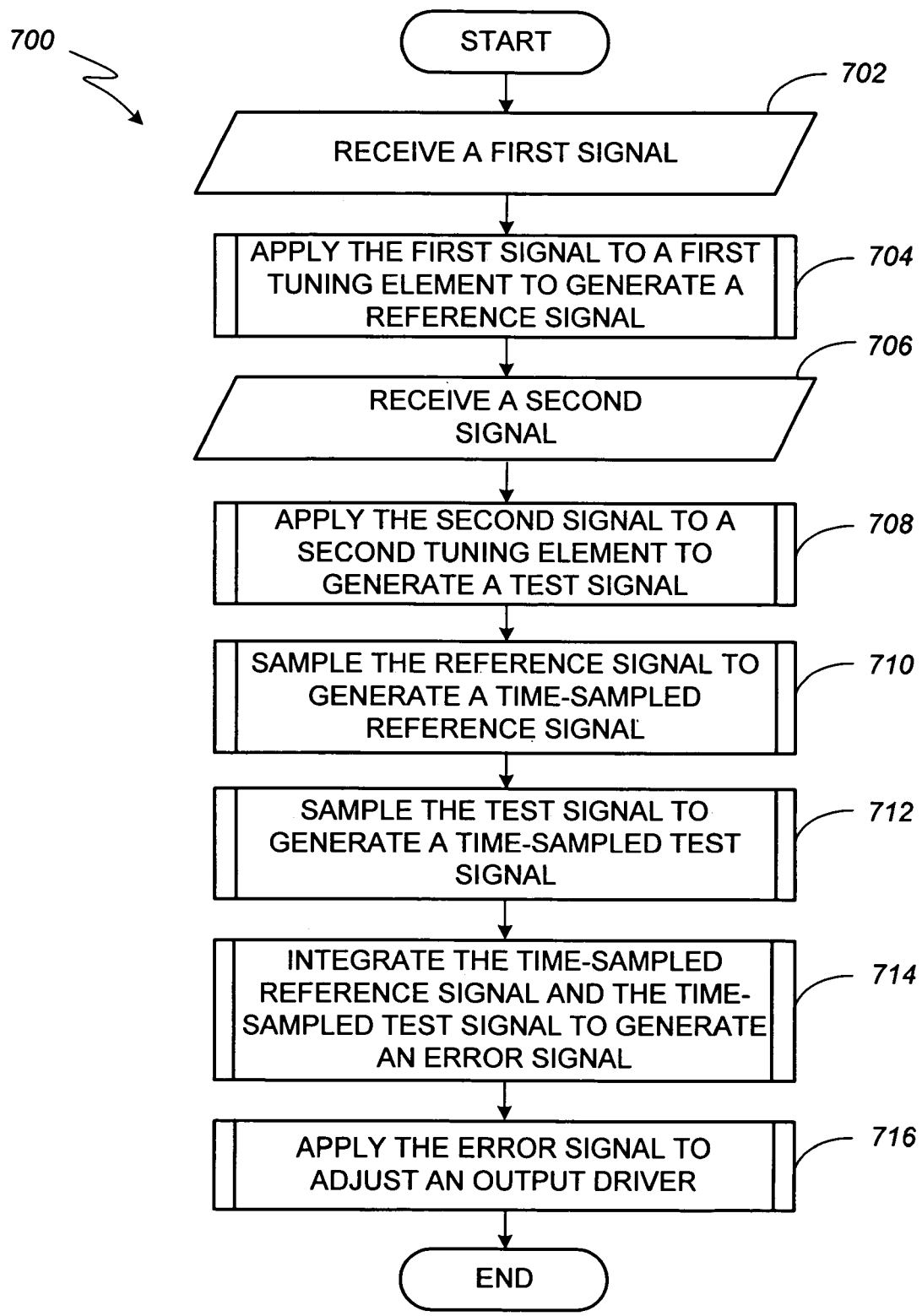
FIG. 7 is a flow diagram illustrating an embodiment of a method for adjusting an output driver.
Figure 8:
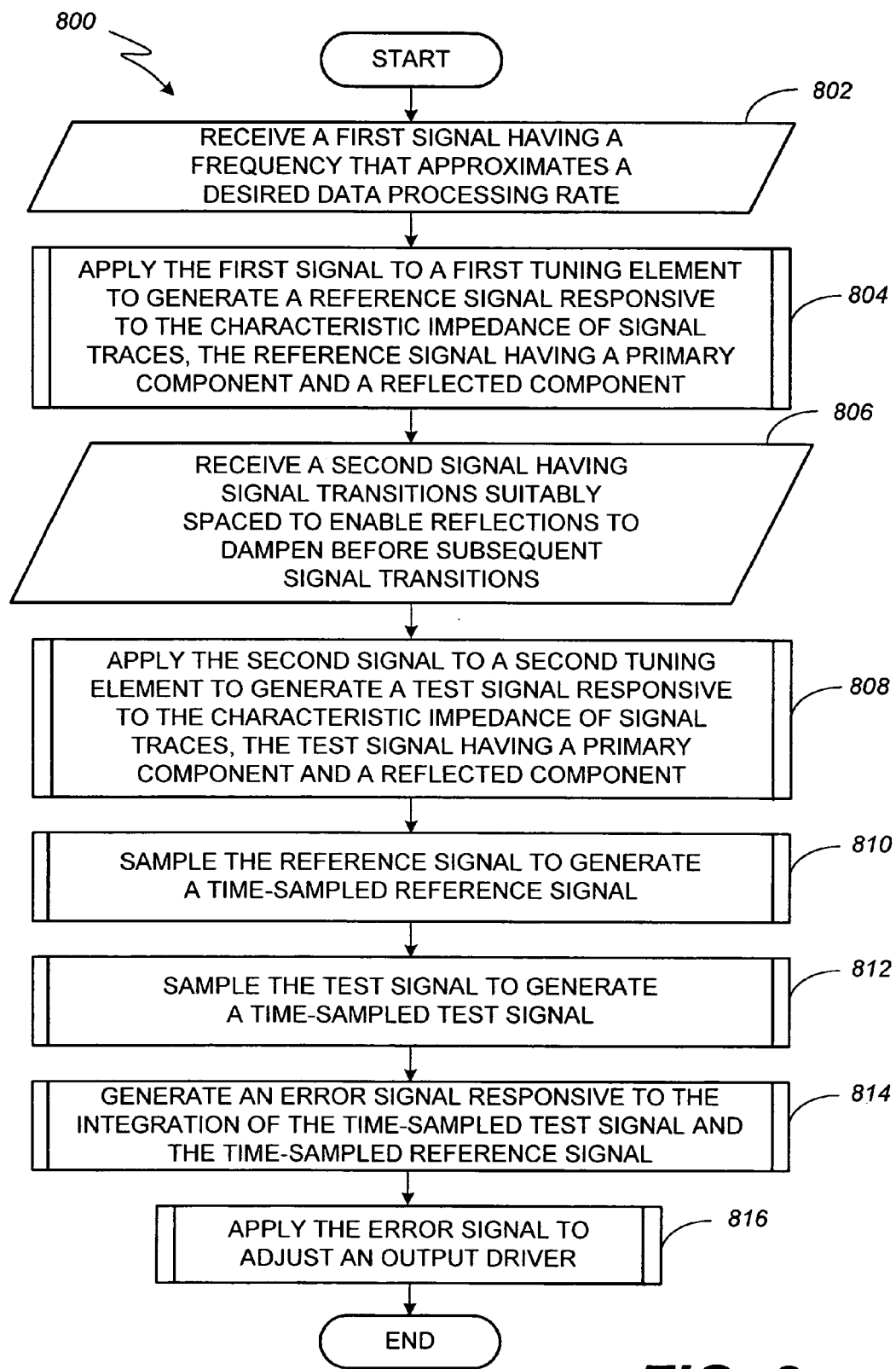
FIG. 8 is a flow diagram illustrating an alternative embodiment of a method for adjusting an output driver.
Figure 9:
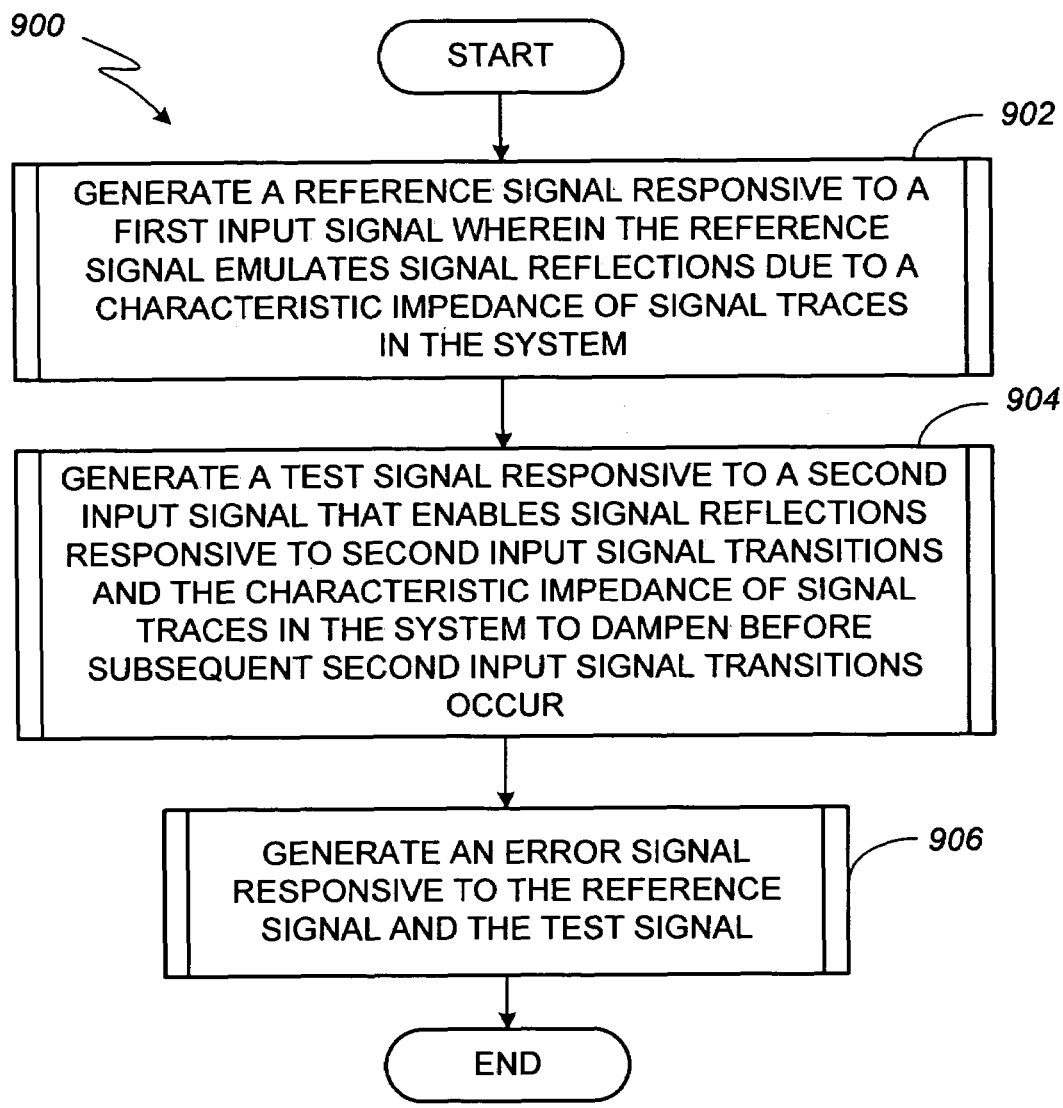
FIG. 9 is a flow diagram illustrating an embodiment of a method for generating an error signal.

Any process descriptions or blocks in the flow diagrams illustrated in FIGS. 7-9 should be understood as representing steps in an associated process. Alternative implementations are included within the scope of the present methods for adjusting an output driver. For example, functions may be executed out-of-order from that shown or discussed, including substantially concurrently or in reverse order, depending on the functionality involved.

FIG. 7 is a flow diagram illustrating an embodiment of a method 700 for adjusting an output driver. As illustrated in FIG. 7, method 700 begins with input/output block 702 where a first signal is received. After the first signal is received, the first signal is applied to a first tuning element to generate a reference signal as indicated in block 704.

As indicated in input/output block 706, a second signal is received. As illustrated in block 708, the second signal is applied to a second tuning element to generate a test signal. While the functions listed in blocks 706 and 708 have been illustrated and described following the functions listed in blocks 702 and 704, it should be understood that the functions associated with blocks 706 and 708 can occur before, after, or substantially simultaneously with the functions associated with blocks 702 and 704.

Once the reference and test signals have been generated as illustrated and described in blocks 704 and 708, the reference and test signals are sampled to generate a time-sampled reference signal as indicated in block 710 and a time-sampled test signal as indicated in block 712. While the sampling function listed in block 712 has been illustrated and described as following the sampling function associated with block 710, it should be understood that the functions associated with blocks 710 and 712 can occur in reverse order or substantially simultaneously with one another.

Thereafter, as illustrated in block 714, an error signal responsive to the time-sampled reference signal generated in block 710 and the time-sampled test signal generated in block 712 is generated by integrating the time-sampled reference signal and the time-sampled test signal generated in blocks 710 and 712, respectively. As indicated in block 716, the error signal generated in block 714 is applied to an output driver to adjust the driver.

FIG. 8 is a flow diagram illustrating an alternative embodiment of a method 800 for adjusting an output driver. As shown in FIG. 8, method 800 begins with input/output block 802 where a first signal is received. The first signal is a time-varying signal having a frequency that approximates a desired data processing rate. After the first signal is received, the first signal is applied to a first tuning element to generate a reference signal as indicated in block 804. As further illustrated in block 804, the reference signal is responsive to the characteristic impedance of transmission lines. The reference signal is a composite signal having a primary component and a reflected component.

As indicated in input/output block 806, a second signal is received. The second signal is configured such that signal transitions are suitably spaced (in time) to enable reflections to dampen before subsequent signal transitions occur. As illustrated in block 808, the second signal is applied to a second tuning element to generate a test signal. The test signal is responsive to the characteristic impedance of transmission lines. The test signal is a composite signal having a primary component and a reflected component. While the functions listed in blocks 806 and 808 have been illustrated and described following the functions listed in blocks 802 and 804, it should be understood that the functions associated with blocks 806 and 808 can occur before, after, or substantially simultaneously with the functions associated with blocks 802 and 804.

Once the reference and test signals have been generated as illustrated and described in blocks 804 and 808, the reference and test signals are sampled to generate a time-sampled reference signal as indicated in block 810 and a time-referenced test signal as indicated in block 812. While the sampling function listed in block 812 has been illustrated and described as following the sampling function associated with block 810, it should be understood that the functions associated with blocks 810 and 812 can occur in reverse order or substantially simultaneously with one another.

Thereafter, as illustrated in block 814, an error signal responsive to the time-sampled reference signal generated in block 810 and the time-sampled test signal generated in block 812 is generated. As indicated in block 816, the error signal generated in block 814 is applied to an output driver to adjust the drive strength of the driver.

FIG. 9 is a flow diagram illustrating an embodiment of a method 900 for generating an error signal. As illustrated in FIG. 9, method 900 begins with block 902 where a reference signal is generated in response to a first input signal. The reference signal emulates signal reflections due to a characteristic impedance of a transmission line in a data transfer system. In block 904, a test signal is generated in response to a second input signal. The test signal enables signal reflections responsive to second input signal transitions and the characteristic impedance of transmission lines within the system to dampen before subsequent second input signal transitions occur. After the reference and test signals have been generated as described above, the reference and test signals are used to generate an error signal as indicated in block 906.

It should be emphasized that the above-described embodiments are merely examples of implementations of the systems and methods for adjusting output drivers. Many variations and modifications may be made to the above-described embodiments. All such modifications and variations are intended to be included herein within the scope of this disclosure and protected by the following claims.

What is claimed is:

1. A method for adjusting an output driver, the method comprising the steps of:
   receiving a first signal;
   applying the first signal to a first tuning element to generate a reference signal;
   receiving a second signal;
   applying the second signal to a second tuning element to generate a test signal, wherein the second tuning element is configured similarly to the first tuning element;
   sampling the reference signal to generate a time-sampled reference signal;
   sampling the test signal to generate a time-sampled test signal;
   integrating the time-sampled reference signal and the time-sampled test signal to generate an error signal; and
   applying the error signal to adjust an output driver.

2. The method of claim 1, wherein receiving a first signal comprises receiving a clock signal.

3. The method of claim 2, wherein the clock signal comprises a frequency of greater than 100 MHz.

4. The method of claim 1, wherein applying the first signal to a first tuning element comprises reflecting the first signal towards a source of the first signal.

5. The method of claim 4, wherein reflecting the first signal towards the source results in the reflected signal arriving at the source when a first half of the first signal has completed exiting the source.

6. The method of claim 1, wherein receiving a second signal comprises enabling reflections generated by a signal transition of the second signal and reflected by the second tuning element to damp out before a subsequent signal transition of the second signal.

7. The method of claim 1, wherein integrating the time-sampled reference signal and the time-sampled test signal comprises applying the signals to a feedback loop.

8. A system, comprising:
   a reference driver coupled to a first tuning element, the reference driver and the first tuning element configured to receive a first input signal and generate a reference signal comprising a primary reference component and a reflected reference component;
   a test driver coupled to a second tuning element, the test driver and the second tuning element configured to receive a second input signal and generate a test signal comprising a primary test component and a reflected test component;
   an integrator configured to receive the reference signal and the test signal and generate an error signal.

9. The system of claim 8, wherein the first tuning element comprises a first transmission line.

10. The system of claim 9, wherein the first printed circuit board trace has an input end coupled to an output of the reference driver and a length that generates the reflected reference component such that the reflected reference component reaches the output of the reference driver in synchronization with the primary reference component.

11. The system of claim 10, wherein the first transmission line has an output end that is electrically open.

12. The system of claim 11, wherein the second transmission line has an input end coupled to an output of the test driver and a length substantially equal to that of the first transmission line.

13. The system of claim 12, wherein the second transmission line has an output end that is electrically open.

14. The system of claim 8, wherein the second tuning element comprises a second transmission line.

15. The system of claim 8, further comprising:
   a delay element configured to receive the second input signal and generate a control signal;
   a first sample and hold circuit coupled between the reference driver and the integrator, the first sample and hold circuit configured to generate a time-sampled reference signal in response to the control signal; and
   a second sample and hold circuit coupled between the test driver and the integrator, the second sample and hold circuit configured to generate a time-sampled test signal in response to the control signal.

16. The system of claim 8, wherein the first input signal comprises a clock signal.

17. The system of claim 16, wherein the clock signal comprises a frequency of greater than 100 MHz.

18. A system for adjusting an output driver to reduce the effect of impedance mismatches between signal sources and signal traces, comprising:
   means for generating a reference signal responsive to a first input signal, wherein the reference signal emulates signal reflections due to a characteristic impedance of transmission lines in the system;
   means for generating a test signal responsive to a second input signal that enables signal reflections responsive to second input signal transitions and the characteristic impedance of transmission lines in the system to dampen before subsequent second input signal transitions; and
   means for generating an error signal responsive to the reference signal and the test signal.

19. The system of claim 18, further comprising:
   means for sampling the reference signal; and
   means for sampling the test signal.

20. The system of claim 18, wherein the means for generating an error signal comprises means for integrating the reference signal and the test signal.

* * * * *